US011689130B2

(12) United States Patent
Kalra et al.

(10) Patent No.: US 11,689,130 B2
(45) Date of Patent: Jun. 27, 2023

(54) MULTI-STAGE SERIAL TURBO-GENERATOR SYSTEM FOR SUPERCRITICAL CO2 POWER CYCLES

(71) Applicant: Heliogen Holdings, Inc., Pasadena, CA (US)

(72) Inventors: Chiranjeev Singh Kalra, Irvine, CA (US); Matthew David Carlson, Littleton, CO (US)

(73) Assignee: Heliogen Holdings, Inc., Pasadena, CA (US)

( * ) Notice: Subject to any disclaimer, the term of this patent is extended or adjusted under 35 U.S.C. 154(b) by 0 days.

(21) Appl. No.: 17/446,816

(22) Filed: Sep. 2, 2021

(65) Prior Publication Data

US 2022/0077798 A1 Mar. 10, 2022

Related U.S. Application Data

(60) Provisional application No. 63/074,766, filed on Sep. 4, 2020.

(51) Int. Cl.
*H02P 9/30* (2006.01)
*F01D 15/10* (2006.01)
*F02C 1/02* (2006.01)

(52) U.S. Cl.
CPC .............. *H02P 9/305* (2013.01); *F01D 15/10* (2013.01); *F02C 1/02* (2013.01); *F05D 2220/32* (2013.01); *F05D 2220/76* (2013.01)

(58) Field of Classification Search
CPC . H02P 9/305; F01D 15/10; F02C 1/02; F05D 2220/32; F05D 2220/76
See application file for complete search history.

(56) References Cited

U.S. PATENT DOCUMENTS

| 10,626,746 B2 | 4/2020 | Malkamaki et al. |
| 2011/0000182 A1* | 1/2011 | Lasker .................... F03G 6/068 60/39.24 |

(Continued)

FOREIGN PATENT DOCUMENTS

| KR | 10-2011-0077027 A | 7/2011 |
| WO | WO 2011/124355 A1 | 10/2011 |

OTHER PUBLICATIONS

Search Report and Written Opinion dated Jan. 6, 2022, received in International Patent Application No. PCT/US2021/049006, in 11 pages.

*Primary Examiner* — Viet P Nguyen
(74) *Attorney, Agent, or Firm* — Knobbe, Martens, Olson & Bear LLP (57) ABSTRACT

A supercritical CO2 turbo-generator system includes multiple turbine generator units, a direct current bus, a plurality of active rectifiers, and a voltage controller. Each turbine generator unit includes a turbine with a supercritical CO2 input and a supercritical CO2 output, a generator with an electrical input and power output, a shaft connecting the turbine and generator, and a speed sensor for sensing shaft speed. The turbine generator units are connected in a cascading series with the input of a first turbine generator unit connected to a heated supercritical CO2 source and the input of each subsequent turbine generator unit is connected to the output of a prior turbine generator unit. The voltage controller monitors the speed sensor of the turbine generator units and varies the load on each generator to control shaft speed. Each active rectifier converts the power output of a generator to direct current, and the power from multiple active rectifiers is combined by the direct current bus.

15 Claims, 5 Drawing Sheets

(56) References Cited

U.S. PATENT DOCUMENTS

2014/0319836 A1    10/2014  Spooner et al.
2018/0252158 A1*    9/2018  Malkamäki ............... F02C 1/06
2021/0131429 A1*    5/2021  Torrey ................... F04B 41/06

* cited by examiner

MULTI-STAGE SERIAL TURBO-GENERATOR SYSTEM FOR SUPERCRITICAL CO2 POWER CYCLES

CROSS-REFERENCE TO RELATED APPLICATION(S)

This application claims the benefit of U.S. Provisional Patent Application Ser. No. 63/074,766 filed Sep. 4, 2020, titled "Multi-stage Serial Turbo-Generator Design for Supercritical CO2 Power Cycles," which is hereby incorporated by reference herein for all purposes.

TECHNICAL FIELD

The invention generally relates to a solar power plant utilizing carbon dioxide. In particular, the invention pertains to a multi-stage, turbo-generator design for a supercritical CO2 (sCO2) power block.

BACKGROUND

Many forms of power plants rely on turbomachinery including turbines, generators, and compressors. Turbomachinery based power plants are highly efficient, reliable, require low maintenance and low cost. However, turbomachines don't scale to lower sizes efficiently. The lower mass flow rate required for smaller power generation applications, results in low specific speeds making rotating turbomachines that cannot hit high efficiency compared to the larger counterparts. At smaller sizes in the power output range 2-25 MWe and up to 50 MWe, especially for supercritical CO2 power blocks, the optimal design of the turbomachinery mechanical components—turbines and compressors—tend to run at rotational speeds of 10,000 to 125,000 rpm to accommodate reasonable tip speeds, blade heights that can be manufactured, and tip clearances. This is critical to achieving the required performance from the overall power cycle.

The electrical machines, on the other hand, tend to be limited in speed and power output. This class of electric machines generally includes permanent magnet electric machines, namely motors and generators. Permanent magnet electric machines operating at 15,000 to 45,000 rpm can scale well up to 1 MWe, 2 MWe, or 3 Mwe. Beyond this electric output range, however, the design at operating high speeds becomes highly challenging and scales sub-linearly. Additional couplings and bearings can be deployed increasing production cost and design complexity. Similarly, a gear box may be employed to match the electric machines speeds with the machine speeds, but this requires shaft end seals to keep supercritical CO2 separate from lubricating oil used in the gearbox, resulting in a non-hermetic design with CO2 leakage from the system that needs to be replenished. The gear box thus increases the shaft end seal complexity as well as the risk of leakage. There is, therefore, a need for a technique to match the operating speed of the electric machines with the turbomachinery mechanical components without undue complexity or leakage.

SUMMARY

In accordance with one aspect of the disclosure, a high-efficiency, multi-stage, turbo-generator design for a supercritical CO2 (sCO2) power block is provided. The individual operation of each stage on its shaft, at its optimal speed, results in high efficiency aero-thermal design of the turbine stages. The turbo-generator design lends itself to a much simpler barrel type or other low-cost casing designs and a simple, low-cost, rotor manufacturing process. Additionally, these single stage turbine impellers can be over-hung on the shaft and not require couplings or additional bearings. The combination of high working fluid (CO2) density, compact wheel sizes at these high operating speeds, and capability to accommodate rather large transition ducts at the end of the casing results in very low pressure drop in the inter-stage piping of less than 1 bar per stage.

In accordance with another aspect of the disclosure, a supercritical CO2 system is provided that comprises a plurality of turbine generator units, a direct current bus, a plurality of active rectifiers, and a voltage controller. Each of plurality of turbine generator units comprises: a turbine with a supercritical CO2 input and a supercritical CO2 output, a generator with an electrical input and power output, a shaft connecting the turbine and generator, and a speed sensor for determining a speed of the associated shaft. The plurality of turbine generator units are connected in the form of a cascading series with the input of a first turbine generator unit connected to a source of heated supercritical CO2. The input of a second turbine generator unit is connected to the output of the first turbine generator unit. The input of a third turbine generator unit is connected to the output of the second turbine generator unit.

Each of the plurality of active rectifiers converts the power output of a generator to direct current, and the power from the plurality of active rectifiers then combined by the direct current bus.

The voltage controller is configured to monitor the speed sensor of each of the plurality of turbine generator units and vary the load or power input on each generator to control shaft speed, during start up and operation.

In one embodiment, there are either two or three turbine generator units operably coupled in series, although more turbine generator units may be employed. The generator in each of the plurality of turbine generator units may take the form of a permanent magnet machine, an induction machine, or wound field machine. One or more of the turbine generator units may include a compressor impeller mounted to the same shaft as the associated turbine and generator. The addition of the compressor impeller on the opposing end of the shaft may potentially provide an axial thrust balanced solution to enable easier startup transient control. The speed sensor of each of the plurality of turbine generator units may include a resolver, opto-isolator slotted disk sensor, hall effect sensor, or proximity probe, for example.

In some embodiments, each of the active rectifiers includes power electronics configured to control the speed of the generator. The power electronics may include insulated-gate bipolar transistors (IGBTs), thyristors, or some other metal-oxide-semiconductor field-effect transistor (MOSFET). The MOSFET, in turn, may include silicon or silicon carbide. The voltage controller, which is coupled to the active rectifiers, may be configured to generate control signals for the power electronics to effectively maintain the rotational speed of the generator/shaft in order to the maximize power cycle efficiency of the supercritical CO2 system or to maximize total output power of the supercritical CO2 system.

BRIEF DESCRIPTION OF THE DRAWINGS

The present invention is illustrated by way of example and not limitation in the figures of the accompanying drawings, and in which.

DETAILED DESCRIPTION

Disclosed herein is a solar power plant using a supercritical CO2 Brayton cycle with a multi-stage turbine generator system. The main advantage of the supercritical CO2 cycle is the high efficiency—which is comparable to the gas Brayton cycle at significantly lower temperature (550° C./823K) but higher pressure (20 MPa/200 normal atmospheres). The supercritical CO2 Brayton cycle can be implemented in various configurations including what are commonly referred to as the "simple cycle", "recompression cycle", "pre-cooled cycle", and other layouts, for example.

In one embodiment, the CO2 Brayton cycle includes turbomachinery for supercritical CO2 Brayton cycle, namely three turbine generator units operatively link in a cascading, multi-stage arrangement. In this cascading arrangement, the output of a first turbine generator unit is provided as input to a second turbine generator unit, and the output of the second turbine generator unit provided as an input to a third turbine generator unit. While the CO2 Brayton cycle described above features three turbine generator units, in other embodiments the CO2 Brayton cycle may employ any number of turbine generator units.

Figure 1A:
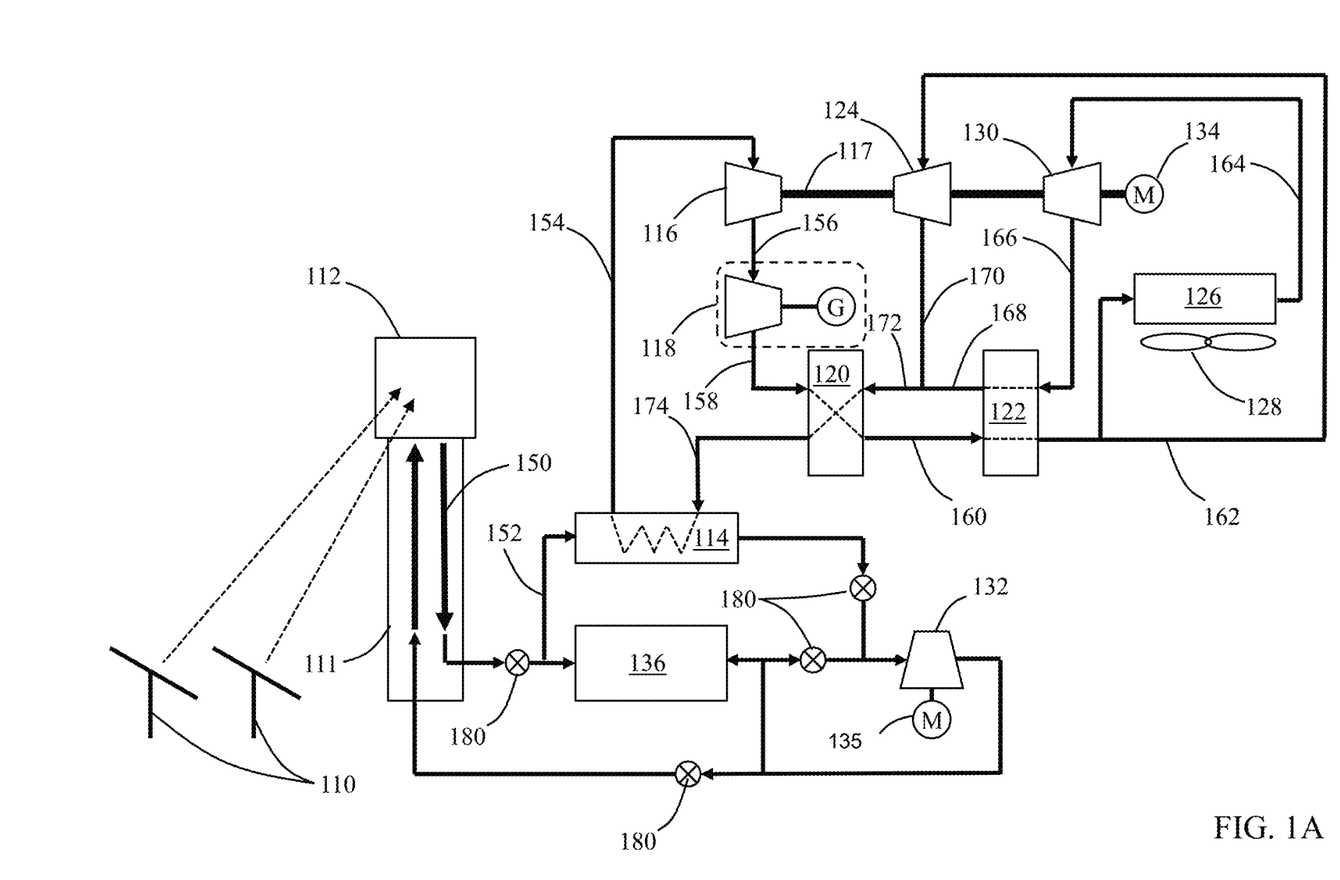
FIG. 1A is a functional block diagram of an embodiment of a solar thermal power plant.
Figure 1B:
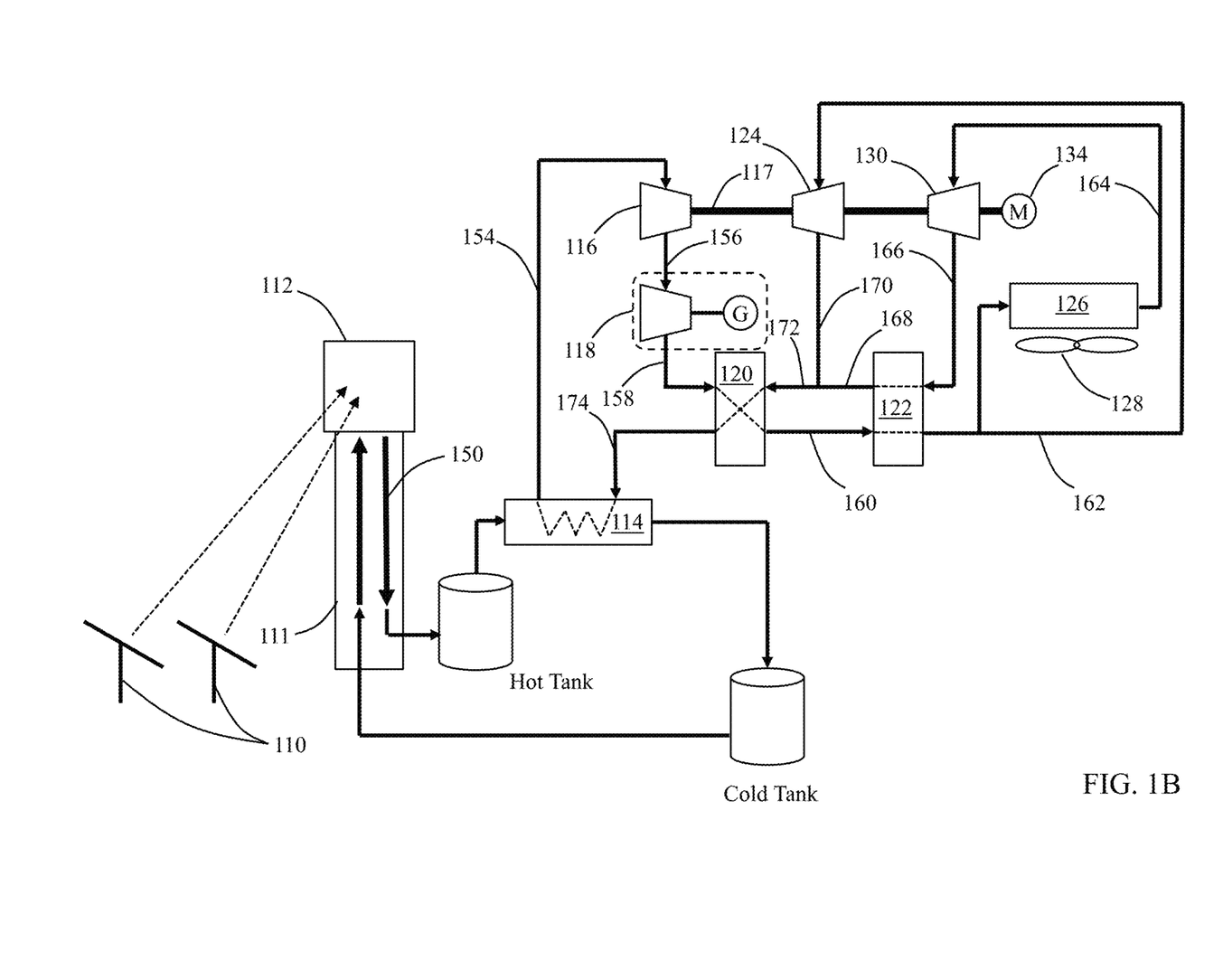
FIG. 1B is a functional block diagram of an embodiment a solar thermal power plant.

Illustrated in FIG. 1A is a solar power plant with a plurality of multi-stage turbine generator units. The power plant includes a concentrated solar power source, a supercritical CO2 (sCO2) power block employing a recompression cycle layout, and thermal energy storage (TES). The solar power source includes a plurality of heliostats 110 and a solar power tower 111 with a cavity receiver 112. The heliostats 110 track the sun over the course of the day and direct sunlight to the receiver 112 where the sunlight is absorbed and the heat captured. In one embodiment, the thermal energy storage system includes a thermocline packed bed TES 136, which includes rocks or gravel, for example, as a solid heat storage media. In another embodiment in FIG. 1B the TES system may be composed of two tanks with one tank filled with hot particles and the other filled with cold particles. During charging, cold particles are heated in the receiver and transferred to the hot tank, and during discharging particles flow from the hot tank through the cold tank through a primary heat exchanger to transfer heat into the power block. The particles may take the form of sand, gravel, and/or rocks, for example The supercritical CO2 power block includes a primary heat exchanger 114, a turbo-compressor 116, a multi-stage turbine generator system 118 with cascading turbine generator units, a high temperature recuperator (HTR) 120, a low temperature recuperator (LTR) 122, and an air or water cooler 126 with fan 128. The turbo-compressor 116 is rigidly affixed to a main compressor (MC) 130, re-compressor (RC) 124, and motor/generator (M) 134 by means of a common shaft or axle. In an alternate embodiment, the turbo-compressor and re-compressor can be on separate turbo-compressor shafts. The recompression cycle has multiple rotating components including the turbine 116, main compressor 130, re-compressor 124, and motor/generator 134. These rotating mechanisms are, ideally, adiabatic and isentropic processes that operate at an isentropic efficiency less than 100% depending on parameters like mass flow rate, inlet state point (temperature and pressure), blade type (axial versus radial), geometry (blade heights, leakage clearances, etc.), and operating speed.

In operation, sunlight from the heliostats 110 impinges on the receiver 112, which heats air or other working fluid, particle, or material to approximately 800 degrees Celsius. The heated fluid 150 is directed to either the heat exchanger 114 or thermal energy storage 136. Assuming the energy is being utilized and not stored, the heated fluid 152 is directed to the heat exchanger 114 where the energy is transferred to the supercritical CO2, referred to herein as sCO2. For a two-tank TES system, the heated material is first stored in the hot tank and then, based on the power demand, passes to the cold tank through the heat exchanger 114 to heat the sCO2.

The supercritical CO2 154 is provided as input to the turbo-compressor 116. In one embodiment, the turbo-compressor 116 includes a radial blade that is fed with a radial inflow. In other embodiments, the turbine blades are axial and the turbine inlet axial with no loss of generality. The turbo-compressor 116, in turn, drives the rotation of the shaft 117 as well as the re-compressor 124, main compressor 130, and motor/generator 134.

Figure 2:
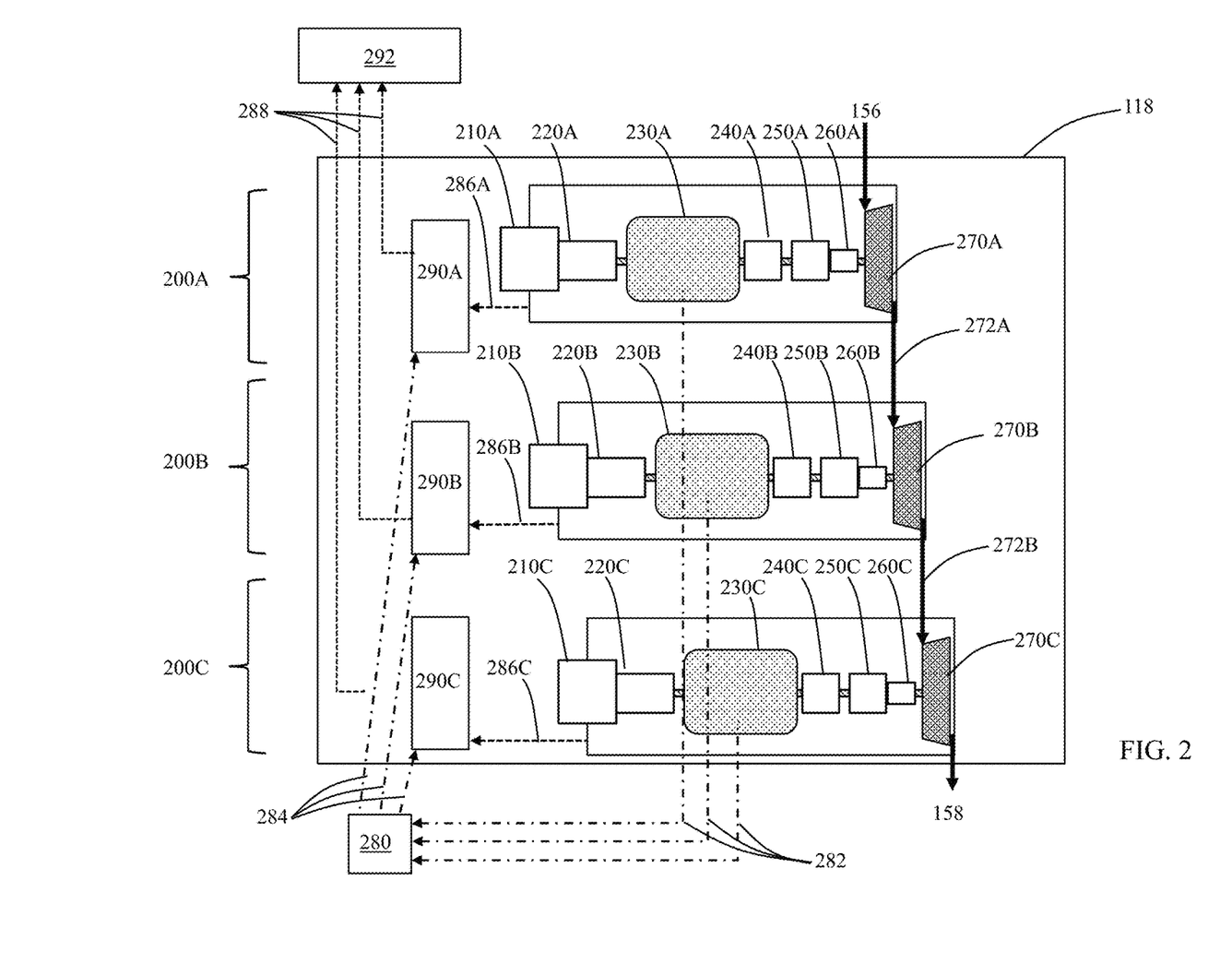
FIG. 2 is functional block diagram of an embodiment of a cascading turbine generator system.

In this embodiment, the sCO2 expelled from the turbo-compressor 116 is then provided as input to the cascaded turbine generator units 118 shown in detail in FIG. 2. In other embodiments, the supercritical CO2 154 is first provided as input to the turbine generator units 118 and the output then directed to the turbine portion 116 of the turbo-compressor, thereby reversing the order in which these two components are powered with sCO2.

The CO2 158 expelled from the multi-stage turbine generator system 118 is then channeled to the high temperature recuperator 120 where heat is extracted and used to preheat CO2 before entering the primary heat exchanger 114. The CO2 expelled 160 from the high temperature recuperator 120, in turn, is transferred to the low temperature recuperator 122 before the CO2 162 is transferred to (i) the cooler 126 with fan 128 as well as the (ii) re-compressor 124. The CO2 164 output of the cooler 126 is transferred to the main compressor 130. In one embodiment, approximately 38 percent of the CO2 162 is directed to the re-compressor 124 while 62 percent of the CO2 162 is directed to the main compressor 130.

The main compressor 130, which is driven by the turbo-compressor turbine 116, restores the pressure of the sCO2 166 to between 200 and 300 bar. This sCO2 flow 166 is then preheated in the low temperature recuperator 122. Similarly, the re-compressor 124 also restores the pressure of the sCO2 flow 170. The sCO2 flow 168 and sCO2 flow 170 are combined into sCO2 flow 172 and heated again by the high temperature recuperator 120. The supercritical CO2 flow 174 is recirculated to the turbo-compressor 116 and the process described above repeated.

In the configuration described above, all the energy acquired by the sun is utilized to generate electricity when acquired. In one implementation, the solar power plant is configured to also store energy for purposes of generating electricity at night, for example. In this configuration, the solar power plant is configured to direct heated air or other working fluid from the cavity receiver 112 to a thermal energy storage device 136, preferably a thermocline packed bed or comparable storage system. In this configuration, the valves 180 are configured to divert heated air 150 from the primary heat exchanger 114 and to the thermal energy storage device 136. The air, after the heat is transferred to the thermal energy storage device 136, is pumped via the blower 132 with motor 135 back to the cavity receiver where it is heated again. At a later point in time, when the sun has set for example, the blower 132 is used to draw air through the thermal energy storage device 136 and the air heated there used by the primary heat exchanger 114 to drive the supercritical CO2 power block described above.

Illustrated in FIG. 2 is a multi-stage, cascading turbine generator system utilized in the supercritical CO2 power block of the present disclosure. The cascading turbine generator system 118 includes a plurality of individual turbine generator units coupled in series. In one embodiment, the sCO2 power block employs three or more turbine generator units—namely a first turbine generator unit 200A, second turbine generator unit 200B, and third turbine generator unit 200C—coupled in series.

Each turbine generator unit 200A-200C includes a turbine 270A-270C and a corresponding generator 230A-230C directly coupled to one another, a thrust bearing 210A-210C, magnetic journal bearings 220A-220C and 240A-240C, a thermal management system 250A-250C, hybrid face seal 260A-260C, active rectifiers 290A-290C, and a generator controller 280 coupled to each of the generator 230A-230C. In some alternative embodiments, the bearings may include various forms of magnetic bearings and/or gas bearings.

The first turbine generator unit 200A is configured to receive supercritical CO2 156 from the turbo-compressor 116. This sCO2 powers the first turbine 270A which, in turn, drives the first generator 230A to produce electricity. The sCO2 output 272A of the first turbine 270A is then provided as input to the second turbine 270B to drive the second generator 230B to produce electricity. The sCO2 output 272B of the second turbine 270B is then provided as input to the third turbine 270C to drive the third generator 230C to produce electricity.

In this embodiment, the CO2 working fluid doesn't interface or mix with any other fluid, e.g. lubricating oil, but it does leak through shaft seals, for example, into the lower pressure generator cavity. This CO2 working fluid is then compressed using an external compression system and added back into the supercritical CO2 system.

In the various embodiments described herein, the turbine 270A-270C and generator 230A-230C of each turbine generator unit are directly coupled, i.e., rigidly coupled, to one another via a common shaft. This configuration relies on high speed electric generators in the 1-2 MWe and up to 3 MWe class. Generators in this class (1) achieve overall conversion efficiencies of greater than 97 percent, including power electronics losses for frequency conversion and regulation, (2) are highly cost effective with specific cost basis of less than $200/kWe for the complete package, including the magnetic bearing packages, electric machine seals and power electronics, (3) are preferred in all existing applications in O&G industry (NG compressor stations), refrigeration and cooling (industrial chillers and coolers), due to their superior performance and ultra-low maintenance costs compared to oil lubricated machines, and (4) are manufactured by several vendors with performance guarantees and capability to integrate various process gasses and applications.

The turbine generator units 200A-200C are electronically coupled to each other via an automated voltage controller 280. In one embodiment, the controller 280 is coupled to and receives a signal 282 from a speed sensor—e.g., a resolver, opto-isolator slotted disk sensor, hall effect sensor, or proximity probe—that determines the speed of the shaft in each of the generators 230A-230C. The controller 280 is also coupled to each of a plurality of active rectifiers 290A-290C, each rectifier configured to regulate the speed of the associated generator 230A-230C. In particular, the voltage controller 280 is configured to provide command signals 284 to limit the power output of each rectifier 290A-290C which, in turn, limits the speed with which each generator 230A-230C turns. During system start up, for example, the controller 280 is configured to regulate the speed of the generators 230A-230C and force them to rotate at the same speed or a determined speed that optimizes the total power output. This effectively balances the system of generators and as well as the CO2 flow therebetween.

Figure 4:
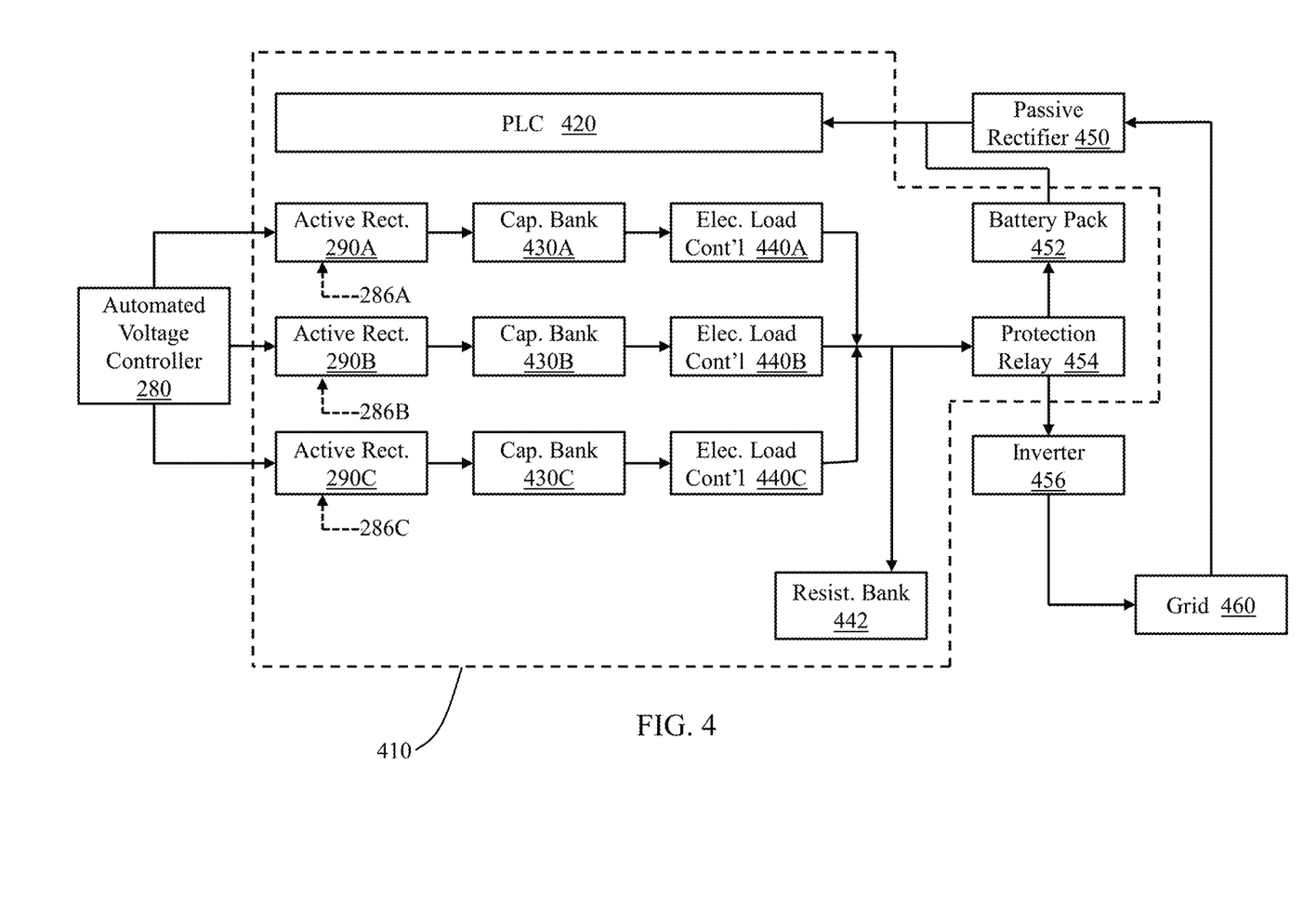
FIG. 4 is a functional block diagram of the power flow from an embodiment of the plurality of generators to an electrical power grid using a direct current bus.

The plurality of active rectifiers 290A-290C are also configured to receive power 286 in the form of high voltage alternating current (AC) from each of the plurality of generators 230A-230C. The plurality of active rectifiers 290A-290C then convert the AC current into direct current (DC). The DC power 288 from the plurality of active rectifiers 290A-290C is then transmitted to a direct current bus 292 configured to the combine current from the plurality of active rectifiers. The power from the direct current bus 292 is conditioned and then distributed to residential, commercial, and industrial customers via an electrical power grid 460 (FIG. 4).

In one embodiment, the optimal design of the turbomachinery mechanical components, i.e., turbines and compressors, can run at high rotational speed (10,000 to 125,000 rpm) to accommodate reasonable (1) tip speeds, (2) blade heights that can be manufactured, and (3) tip clearances. This combination of design parameters in the design of turbomachinery advantageously facilitates achieving the required performance from the overall power cycle. The electrical machines on the other hand, tend to be limited in the possible combination of speeds and power output. High speed electric machines (10,000 to 125,000 rpm) that can achieve 95% or higher electric conversion efficiency, as required for this application, are permanent magnet electric machines (motor and generators). Permanent magnet electric machines scale well up to 1 MWe, 2 MWe, or 3 MWe while operating at high speeds (10,000 to 45,000 rpm) but beyond this electric output range, the design becomes highly challenging and scales sub-linearly. The use of a gear box to match the machine speeds has been employed before but this results in the requirement of shaft end seals to keep separate the sCO2 and lubricating oil used in the gearbox. The shaft end seal complexity and leakage are non-desirable consequences of such design.

In contrast to the embodiments disclosed herein, prior art systems may use a single turbogenerator machine. However, at small scales of power generation in the 2-25 MWe range and up to 50 MWe, this results in turbine pressure ratios that are too small to accommodate the overall power cycle requirements for efficient operation. At these low mass flow rates, in one configuration, the typical blade height is relatively small in relation to the tip clearance, resulting in significant seal leakages and thus the inability of this design to achieve high thermal conversion efficiency.

Figure 3:
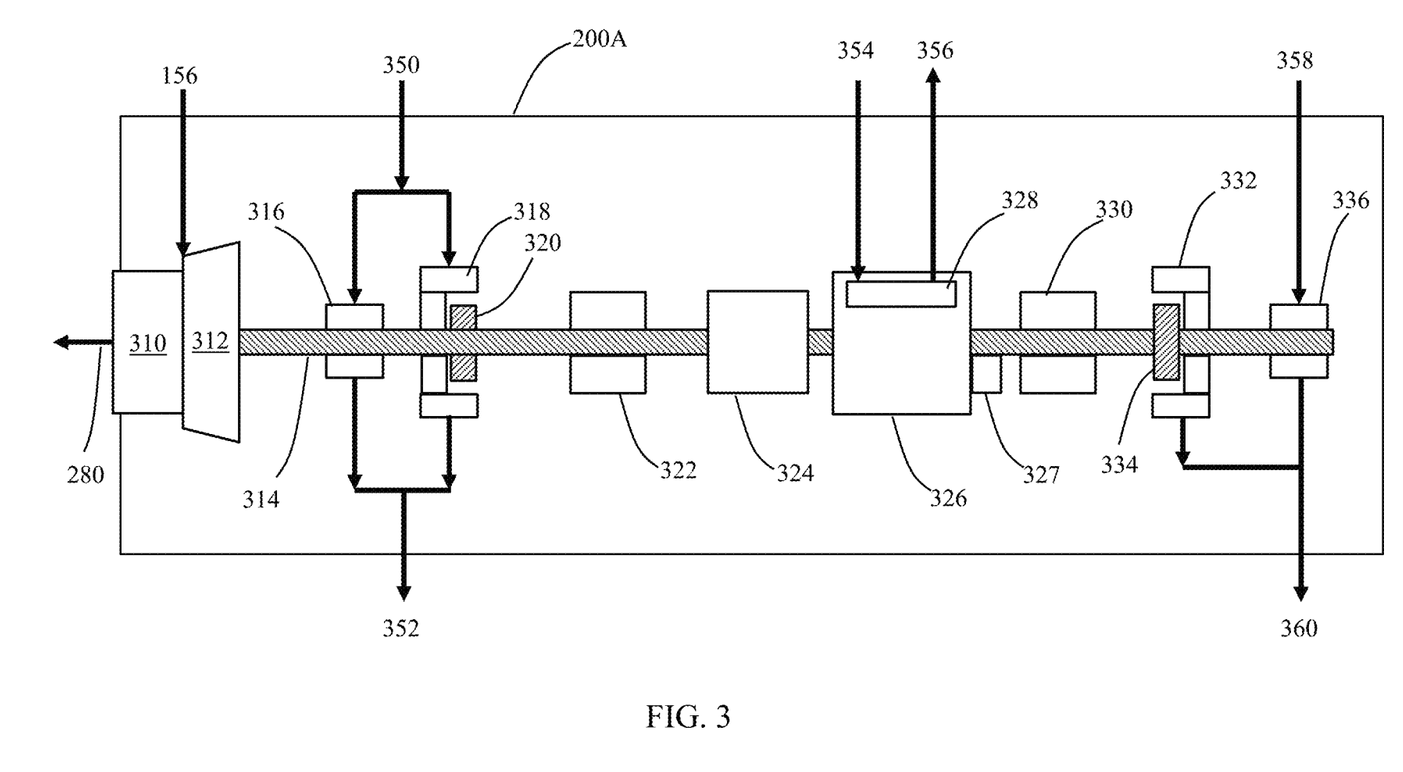
FIG. 3 is a functional block diagram of an embodiment of one of a plurality of turbine generators.

Illustrated in FIG. 3 is a functional block diagram of one 200A of the plurality of turbine generator units 200A-200C, in accordance with another embodiment. The turbine generator unit 200A includes a diffuser 310, a turbine 312 with radial or axial input, a drive shaft 314 rigidly affixed to the turbine 312, a first bearing 316, a first high-pressure CO2 thrust bearing 318 acting on a thrust plate 320 affixed to the shaft 314, first high pressure seal 322, a resolver 324, a generator 326 with internal cavity 328 cooled with cold CO2 354, 356, second high pressure seal 330, a second high-pressure CO2 thrust bearing 332 acting on a thrust plate 334 affixed to the shaft 314, a second bearing 336, and a rotational speed sensor 327. The first bearing 316 is injected with high-pressure CO2 350, 352, while the second bearing 336 is injected with high-pressure CO2 358, 360. In an alternative embodiment, one or more magnetic bearings may be employed in place of high-pressure CO2 bearings.

In this embodiment, the first high pressure seal 322 and second high pressure seal 330 are configured to form a low pressure region containing the resolver 324 and generator 326.

Illustrated in FIG. 4 is a functional block diagram of a direct current bus 410 showing the power flow from the plurality of generators 230A-230C to the electrical power grid 460. Each generator 230A-230C feeds output power 286A-286C to a corresponding active rectifier 290A-290C, which converts the high voltage alternating current (AC) into direct current (DC) using metal-oxide-semiconductor field-effect transistors (MOSFETs) instead of standard diodes to decreasing on-state resistance and therefore increase conversion efficiency. A speed sensor (not shown) within each generator 230A-230C is connected to an automated voltage controller 280, which sends command signals to the active rectifiers 290A-290C to modulate the switching frequency of the internal MOSFETS to regulate the load on the generators and therefore regulate the speed of each generator.

The voltage controller 280 is configured to force or otherwise constrain the plurality of turbo-generator shafts 314 to operate at a synchronized speed without being on the same shaft in order to simplify overall cycle control and eliminate the need for throttle and bypass valves on each turbine. The speed of each shaft 314 can be synchronized to rotate at the same speed, or the speed of the shafts may differ in a pre-determined manner or with a predetermined difference while ramping up and down in speed in a synchronous way in order to produce the highest possible power, efficiency, or maintain some other operating target during cycle operation. Each active rectifier 290A-290C is further connected to a smoothing capacitor bank 430A-430C and an electronic load controller 440A-440C that sends power to either the protection relays 454, inverter 456, and finally to the municipal electrical power grid 460 or to an overspeed resistor bank 442 when the power block is not connected to or synchronized with the grid 460.

As shown in FIG, the functional block diagram further includes a programmable logic controller 420, passive rectifier 450, battery pack 452, protection relay 454, inverter 456, and resistor bank 442. The programmable logic controller (PLC) 420 is configured to take in a frequency and waveform input from active rectifiers 290A-290C and capacitor bank 430A-430C, and control the active rectifiers with respect to frequency and waveform conditioning. The PLC also determines whether to toggle off the relay 454 if, for example, the grid 460 inter-connect is lost.

The passive rectifier 450 is configured to convert the grid alternating current (AC) into DC voltage for consumption by PLC 420. The battery pack 452 is used to provide a buffer in case of transient and dynamic power events. The inverter 456 is configured to convert the DC current being generated into AC current supplied to the grid 460 inter-connect. The resistor bank 442 is used to provide a load (grid load) for the generators if and when the grid inter-connect is lost or some other dynamic event occurs. The protection relay 454 is configured to divert the power output from the generators to the resistor bank instead of the grid 460 if the grid interconnect (grid load) fails to function, sometimes referred to as a "loss of load".

Additional Embodiments

In embodiments of the present disclosure, a supercritical CO2 system may be in accordance with any of the following clauses:

Clause 1: A supercritical CO2 system comprising:
a plurality of turbine generator units comprising a first turbine generator unit, each of the plurality of turbine generator units comprising:
 a) a turbine with a supercritical CO2 input and a supercritical CO2 output;
 b) a generator with an electrical input and power output;
 c) a shaft connecting the turbine and generator; and
 d) a speed sensor for determining a speed of the associated shaft;
wherein the first turbine generator unit input is configured to receive supercritical CO2 from a heat source, and the supercritical CO2 input of each of the one or more additional turbine generator units is coupled to the supercritical CO2 output of the first turbine generator unit or one of the additional turbine generator units; wherein the plurality of turbine generator units are characterized by a series-connected cascade of turbine generators;
a direct current bus;
a plurality of active rectifiers, each active rectifier comprising a power input and power output; wherein the power input of each active rectifier is connected to the power output of the generator of one of the plurality of turbine generator units; and wherein the power output of each active rectifier is connected to a direct current bus configured to combine power from the plurality of active rectifiers; and
an voltage controller configured to receive a speed from the speed sensor of each of the plurality of turbine generator units, and further configured output a control signal to the plurality of active rectifiers; wherein the voltage controller is configured to monitor the speed of each generator shaft and command each rectifier to vary a power electronic switching frequency to increase or decrease a load on each generator to control shaft speed.

Clause 2: The supercritical CO2 system of clause 1, wherein the number of turbine generator units in series is three.

Clause 3: The supercritical CO2 system of clause 1, wherein the number of turbine generator units in series is two.

Clause 4: The supercritical CO2 system of any preceding clause, wherein the generator of each of the plurality of turbine generator units comprises permanent magnets, an induction machine, or wound field.

Clause 5: The supercritical CO2 system of any preceding clause, wherein one or more turbine generator units comprises a compressor impeller mounted to the same shaft as the associated turbine and generator.

Clause 6: The supercritical CO2 system of any preceding clause, wherein the speed sensor of each of the plurality of turbine generator units comprises a resolver, opto-isolator slotted disk sensor, hall effect sensor, or proximity probe.

Clause 7: The supercritical CO2 system of any preceding clause, wherein the active rectifier of each of the plurality of turbine generator units comprises power electronics with insulated-gate bipolar transistors (IGBTs), thyristors, or some other metal-oxide-semiconductor field-effect transistor (MOSFET).

Clause 8: The supercritical CO2 system of clause 7, wherein the active rectifier MOSFET comprises silicon or silicon carbide.

Clause 9: The supercritical CO2 system of any preceding clause, wherein the voltage controller is configured to maintain shaft speeds to maximize power cycle efficiency or maximize total output power.

Clause 10: A supercritical CO2 system coupled to a heat source, the supercritical CO2 system comprising:
  a plurality of turbine generator units comprising a first turbine generator unit, a second turbine generator unit, and a third turbine generator unit, each of the plurality of turbine generator units comprising:
    a) a turbine with a supercritical CO2 input and a supercritical CO2 output;
    b) a generator; and
    c) a shaft connecting the turbine and generator;
    wherein the supercritical CO2 input of the first turbine generator unit is configured to receive supercritical CO2 from the heat source;
    wherein the supercritical CO2 input of the second turbine generator unit is coupled to the supercritical CO2 output of the first turbine generator unit;
    wherein the supercritical CO2 input of the third turbine generator unit is coupled to the supercritical CO2 output of the second turbine generator unit;
  a plurality of active rectifiers, each active rectifier connected to one generator of one of the plurality of turbine generator units; and wherein the plurality of active rectifiers are configured to convert alternating current from the plurality of generators to direct current; and
  a voltage controller configured to output a control signal to the plurality of active rectifiers to vary a load on each generator to control a rotational speed of each generator.

Clause 11: The supercritical CO2 system of clause 10, wherein one or more turbine generator units comprises a compressor impeller mounted to the same shaft as the associated turbine and generator.

Clause 12: The supercritical CO2 system of any of clauses 10-11, wherein the voltage controller is configured to maintain a rotation speed of each generator to maximize power cycle efficiency.

Clause 13: The supercritical CO2 system of any of clauses 10-12, wherein the voltage controller is configured to maintain a rotation speed of each generator to maximize total output power of the rectifiers.

Clause 14: A supercritical CO2 system coupled to a heat source, the supercritical CO2 system comprising:
  a plurality of turbine generator units comprising a first turbine generator unit and a second turbine generator unit, each of the plurality of turbine generator units comprising:
    a) a turbine with a supercritical CO2 input and a supercritical CO2 output;
    b) a generator; and
    c) a shaft connecting the turbine and generator;
    wherein the supercritical CO2 input of the first turbine generator unit is configured to receive supercritical CO2 from the heat source; and
    wherein the supercritical CO2 input of the second turbine generator unit is coupled to the supercritical CO2 output of the first turbine generator unit;
  a plurality of active rectifiers, each active rectifier connected to one generator of one of the plurality of turbine generator units; and wherein the plurality of active rectifiers are configured to convert alternating current from the plurality of generators to direct current; and
  a voltage controller configured to output a control signal to the plurality of active rectifiers to vary a load on each generator to control a rotational speed of each generator.

Clause 15: The supercritical CO2 system of clause 14, wherein the voltage controller is configured to maintain a rotation speed of each generator to maximize power cycle efficiency.

One or more embodiments disclosed herein may be implemented with one or more computer readable media, wherein each medium may be configured to include thereon data or computer executable instructions for manipulating data. The computer executable instructions include data structures, objects, programs, routines, or other program modules that may be accessed by a processing system, such as one associated with a general-purpose computer or processor capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system. Examples of mass storage devices incorporating computer readable media include hard disk drives, magnetic disk drives, tape drives, optical disk drives, and solid state memory chips, for example. The term processor as used herein refers to a number of processing devices including personal computing devices, mobile phones, servers, general purpose computers, special purpose computers, application-specific integrated circuit (ASIC), and digital/analog electronic circuits with discrete components, for example.

Although the description above contains many specifications, these should not be construed as limiting the scope of the invention but as merely providing illustrations of some of the presently preferred embodiments of this invention.

Therefore, the invention has been disclosed by way of example and not limitation, and reference should be made to the following claims to determine the scope of the present invention.

We claim:

1. A supercritical CO2 system comprising:
  a plurality of turbine generator units comprising a first turbine generator unit and one or more additional turbine generator units, each of the plurality of turbine generator units comprising:
    a) a turbine with an input and an output;
    b) a generator with a power output;
    c) a shaft connecting the turbine and the generator;

d) a speed sensor for sensing a speed of the shaft;
wherein the input of the first turbine generator unit is configured to receive supercritical CO2 from a heat exchanger in communication with a heat source, and the input of each of the one or more additional turbine generator units is coupled to the output of the first turbine generator unit or one of the additional turbine generator units and configured to receive supercritical CO2 therefrom; wherein the plurality of turbine generator units form a series-connected cascade of turbine generators;
a direct current bus;
a plurality of active rectifiers, each active rectifier comprising a power input and power output; wherein the power input of each active rectifier is connected to the power output of the generator of one of the plurality of turbine generator units; and wherein the power output of each active rectifier is connected to a direct current bus configured to combine power from the plurality of active rectifiers;
a voltage controller configured to receive a speed from the speed sensor of each of the plurality of turbine generator units, and further configured output a control signal to the plurality of active rectifiers; wherein the voltage controller is configured to monitor the speed of each generator shaft and command each rectifier to vary a power electronic switching frequency to increase or decrease a load on each generator to control shaft speed; and
a compressor and a re-compressor each configured to receive a portion of the supercritical CO2 from the output of the turbine of a last of the plurality of turbine generator units, the compressor and re-compressor each configured to compress said portion of the supercritical CO2 that is recirculated to the heat exchanger.

2. The supercritical CO2 system of claim 1, wherein the number of turbine generator units in series is three.

3. The supercritical CO2 system of claim 1, wherein the number of turbine generator units in series is two.

4. The supercritical CO2 system of claim 1, wherein the generator of each of the plurality of turbine generator units comprises permanent magnets, an induction machine, or wound field.

5. The supercritical CO2 system of claim 1, wherein the one or more turbine generator units comprises a compressor impeller mounted to the shaft.

6. The supercritical CO2 system of claim 1, wherein the speed sensor of each of the plurality of turbine generator units comprises a resolver, opto-isolator slotted disk sensor, hall effect sensor, or proximity probe.

7. The supercritical CO2 system of claim 1, wherein the active rectifier of each of the plurality of turbine generator units comprises power electronics with insulated-gate bipolar transistors (IGBTs), thyristors, or some other metal-oxide-semiconductor field-effect transistor (MOSFET).

8. The supercritical CO2 system of claim 7, wherein the active rectifier MOSFET comprises silicon or silicon carbide.

9. The supercritical CO2 system of claim 1, wherein the voltage controller is configured to maintain shaft speeds to maximize power cycle efficiency or maximize total output power.

10. A supercritical CO2 system coupled to a heat source, the supercritical CO2 system comprising:
a plurality of turbine generator units comprising a first turbine generator unit, a second turbine generator unit, and a third turbine generator unit, each of the plurality of turbine generator units comprising:
a) a turbine with an input and an output;
b) a generator; and
c) a shaft connecting the turbine and generator;
wherein the input of the first turbine generator unit is configured to receive supercritical CO2 from a heat exchanger in communication with the heat source;
wherein the input of the second turbine generator unit is coupled to the output of the first turbine generator unit and configured to receive supercritical CO2 therefrom;
wherein the input of the third turbine generator unit is coupled to the output of the second turbine generator unit and configured to receive supercritical CO2 therefrom;
a plurality of active rectifiers, each active rectifier connected to one generator of one of the plurality of turbine generator units; and wherein the plurality of active rectifiers are configured to convert alternating current from the plurality of generators to direct current;
a voltage controller configured to output a control signal to the plurality of active rectifiers to vary a load on each generator to control a rotational speed of each generator; and
a compressor and a re-compressor each configured to receive a portion of the supercritical CO2 from the output of the turbine of the third turbine generator unit, the compressor and re-compressor each configured to compress said portion of the supercritical CO2 that is recirculated to the heat exchanger.

11. The supercritical CO2 system of claim 10, wherein one or more turbine generator units comprises a compressor impeller mounted to the shaft.

12. The supercritical CO2 system of claim 11, wherein the voltage controller is configured to maintain a rotation speed of each generator to maximize power cycle efficiency.

13. The supercritical CO2 system of claim 11, wherein the voltage controller is configured to maintain a rotation speed of each generator to maximize total output power of the rectifiers.

14. A supercritical CO2 system coupled to a heat source, the supercritical CO2 system comprising:
a plurality of turbine generator units comprising a first turbine generator unit and a second turbine generator unit, each of the plurality of turbine generator units comprising:
a) a turbine with an input and an output;
b) a generator; and
c) a shaft connecting the turbine and generator;
wherein the input of the first turbine generator unit is configured to receive supercritical CO2 from a heat exchanger in communication with the heat source; and
wherein the input of the second turbine generator unit is coupled to the output of the first turbine generator unit and configured to receive supercritical CO2 therefrom;
a plurality of active rectifiers, each active rectifier connected to one generator of one of the plurality of turbine generator units; and wherein the plurality of active rectifiers are configured to convert alternating current from the plurality of generators to direct current;
a voltage controller configured to output a control signal to the plurality of active rectifiers to vary a load on each generator to control a rotational speed of each generator; and a compressor and a re-compressor each configured to receive a portion of the supercritical CO2 from the output of the turbine of the second turbine generator unit, the compressor and re-compressor each configured to compress said portion of the supercritical CO2 that is recirculated to the heat exchanger.

15. The supercritical CO2 system of claim 14, wherein the voltage controller is configured to maintain a rotation speed of each generator to maximize power cycle efficiency.

* * * * *

UNITED STATES PATENT AND TRADEMARK OFFICE
CERTIFICATE OF CORRECTION

| | | |
|---|---|---|
| PATENT NO. | : 11,689,130 B2 | Page 1 of 1 |
| APPLICATION NO. | : 17/446816 | |
| DATED | : June 27, 2023 | |
| INVENTOR(S) | : Chiranjeev Singh Kalra et al. | |

It is certified that error appears in the above-identified patent and that said Letters Patent is hereby corrected as shown below:

In the Specification

On Column 3, Line 56: Delete "example" and insert -- example. --.

In the Claims

On Column 10, Line 67: In Claim 1, after "generator;" insert -- and --.

Signed and Sealed this
Fifth Day of September, 2023

*Katherine Kelly Vidal*

Katherine Kelly Vidal
*Director of the United States Patent and Trademark Office*